US010019595B2

(12) United States Patent
Ukil et al.

(10) Patent No.: US 10,019,595 B2
(45) Date of Patent: Jul. 10, 2018

(54) SYSTEM AND METHOD FOR PROVIDING SENSITIVE INFORMATION ACCESS CONTROL

(71) Applicant: Tata Consultancy Services Limited, Mumbai (IN)

(72) Inventors: Arijit Ukil, Kolkata (IN); Joel Joseph, Pune (IN); Vijayanand Banahatti, Pune (IN); Sachin Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 14/761,367

(22) PCT Filed: Dec. 26, 2013

(86) PCT No.: PCT/IN2013/000804
§ 371 (c)(1),
(2) Date: Jul. 16, 2015

(87) PCT Pub. No.: WO2014/111952
PCT Pub. Date: Jul. 24, 2014

(65) Prior Publication Data
US 2015/0356317 A1 Dec. 10, 2015

(30) Foreign Application Priority Data

Jan. 17, 2013 (IN) .......................... 157/MUM/2013

(51) Int. Cl.
*G06F 21/62* (2013.01)

(52) U.S. Cl.
CPC ................. *G06F 21/6245* (2013.01)

(58) Field of Classification Search
CPC .................. G06F 21/6245; G06F 21/6272
(Continued)

(56) References Cited

U.S. PATENT DOCUMENTS 5,918,222 A  6/1999 Fukui et al.
7,228,291 B2  6/2007 Seamons et al.
(Continued)

FOREIGN PATENT DOCUMENTS

EP  2079214 A1  7/2009

OTHER PUBLICATIONS

Chenyun Dai, et al. "Privacy-Preserving Assessment of Social Network Data Trustworthiness", Purdue University, CERIAS Tech Report Aug. 2012 (13 pages).
(Continued)

*Primary Examiner* — Ellen Tran
(74) *Attorney, Agent, or Firm* — Shumaker, Loop & Kendrick, LLP

(57) ABSTRACT

A system and method enabling information access control of the sensitive information, based on a trust computing platform is provided. The trustworthiness of the information seekers is computed and accordingly the information owner is capacitated to decide upon sharing the information completely or sharing with some perturbation. The objective is to provide the information owner with the ability to decide on sharing its private data with respect to a parameter so that the decision is less subjective. This invention allows minimum leakage of sensitive data and makes information owner aware of the risk of privacy breach when private data is shared.

15 Claims, 2 Drawing Sheets

(58) Field of Classification Search
USPC .......................................... 713/165; 726/26
See application file for complete search history.

(56) References Cited

U.S. PATENT DOCUMENTS

| | | | |
|---|---|---|---|
| 7,272,719 B2 | 9/2007 | Bleckmann et al. | |
| 7,483,947 B2 | 1/2009 | Starbuck et al. | |
| 7,707,413 B2 | 4/2010 | Lunt et al. | |
| 8,966,642 B2 | 2/2015 | Quinn et al. | |
| 2004/0181665 A1 | 9/2004 | Houser | |
| 2004/0221062 A1 | 11/2004 | Starbuck et al. | |
| 2009/0031426 A1 | 1/2009 | Dal Lago et al. | |
| 2009/0216859 A1 | 8/2009 | Dolling et al. | |
| 2010/0257577 A1* | 10/2010 | Grandison | G06Q 50/01 726/1 |
| 2010/0280965 A1* | 11/2010 | Vesterinen | G06F 21/6245 705/319 |
| 2011/0119661 A1* | 5/2011 | Agrawal | G06F 21/566 717/154 |
| 2011/0126290 A1* | 5/2011 | Krishnamurthy | G06F 21/6263 726/26 |
| 2011/0178943 A1* | 7/2011 | Motahari | G06F 21/6254 705/325 |
| 2011/0179477 A1 | 7/2011 | Starnes et al. | |
| 2012/0110674 A1 | 5/2012 | Belani et al. | |
| 2012/0116923 A1 | 5/2012 | Irving et al. | |
| 2012/0159647 A1* | 6/2012 | Sanin | H04L 51/32 726/28 |
| 2012/0260345 A1 | 10/2012 | Quinn et al. | |
| 2012/0331567 A1* | 12/2012 | Shelton | G06F 21/6245 726/28 |

OTHER PUBLICATIONS

Elisa Bertino, "Data Security" Purdue University, retrieved date: Jul. 13, 2015 (30 pages).

International Search Report for PCT/IN2013/000804 dated Jan. 21, 2015 (3 pages).

* cited by examiner

Quasi-identifier information gathering from auxiliary sources ············▶

Negotiation and permission ◄ ─ ─ ─ ─▶

SYSTEM AND METHOD FOR PROVIDING SENSITIVE INFORMATION ACCESS CONTROL

CROSS REFERENCE TO RELATED APPLICATIONS

This is a 35 U.S.C. § 371 U.S. National Stage filing claiming priority from to PCT/IN2013/000804 filed Dec. 26, 2013, which claims priority from Indian Patent Application No. 157/MUM/2013 filed on Jan. 17, 2013, each Application being incorporated by reference in its entirety.

FIELD OF THE INVENTION

The invention generally relates to method for controlling access to information and more particularly to method and system for controlling information access by utilizing a trusted computing platform while sharing sensitive information.

BACKGROUND OF THE INVENTION

With the advent of communicating networks and other related devices handling, processing and transmitting of highly sensitive information has raised concern for the information owners engaged in electronic commerce, health insurance service provides and other such secure transactions. Efforts have been made in past to maintain integrity, validity and confidentiality of these communication channels, but conceited. One major gap existing in prior art solutions is their consideration of trust and privacy as two different aspects of ubiquitous computing applications. It shall be acknowledged that with the evolution of smart applications, trust and privacy cannot be considered as non-intersecting aspects.

Prior art mostly deals with finding ways of hiding the private data in case of data mining without explicitly providing the methodology for quantifying privacy breach probability of a secret data when shared. None of the prior arts mention provision of a trusted computing platform that can provide the required platform for the users or applications to assess the cost in terms of privacy leak when they plan to be part of such kind of smart activities, and without estimating the cost of privacy breach, private data sharing may yield severe consequences. For example, in participating sensing, crowd sourcing and other volunteering kind of applications, when data is shared for global or community purpose, privacy preserving capability of shared data needs to be known a priori. If not known citizens may not participate in such kind of activities as the private information can be potentially leaked when confirmed trust relationship between different entities involved does not exist. The success of such applications where users voluntarily share their private data for global benefit, therefore, lies in building confidence of privacy preservation among the users and providing a negotiation based framework to decide on sharing private data. Thus, it is challenging to provide for private sharing of information a secure transactional environment without a robust trust management mechanism. Additionally, since sharing of highly confidential information makes it prerogative for the information owner to decide, negotiate and permit the use of sensitive information being shared, required is a negotiation enabling trusted platform for sharing the information in a most secure and trusted way.

SUMMARY

It is the principle object of the present invention to provide a negotiation based trusted computing network enabling information access control to the information owner.

Another significant object of the invention is to enable a trusted platform to identify the trusted end user based on a trust score for sharing therewith the sensitive information.

It is another object of the present invention to vest the information owner with an authority to decide upon the extent of sensitive information to be shared.

Yet another object of the invention is to minimize risk of privacy breach during transmittance of sensitive information between the information owner and the intended end users.

In yet another object, the system of the present invention assists the information owner to compute and choose the end user with a highest trusted score for sharing the highly sensitive information.

In one aspect of the invention an information access control method is provided which is further based on trustworthiness computing mechanism, the method comprising of following steps:

Firstly, the information owner is provided with an information structure that includes partly a set of quasi identifier information that is obtained from a plurality of auxiliary sources, and in other part a sensitive information that is desired to be shared;

Next a request from one or more consumers is received by the information owner to share the sensitive information;

Now the trustworthiness of each of the requesting consumer is computed based upon a trust score that is further computed from a probability score. This probability score is indicative of the sensitive information privacy breach and evaluated from an exploitation factor, wherein said exploitation factor is derived from availability of quasi identifier information to the corresponding consumer and also upon the potency of each of the consumer to deduce the sensitive information from the available quasi identifier information; and next the information owner is enabled to negotiate upon degree of the sensitive information to be shared therewith and restrictively share the sensitive information thereon.

In one other aspect of the invention, a processor-implemented information access control system is provided that enables an information owner to restrictively share information with one or more consumer based on trustworthiness computing mechanism, the system comprising:

an information module that is configured to define an information structure that partly includes a set of quasi identifier information obtained from a plurality of auxiliary sources, and partly a sensitive information;

a trust management module that is configured to compute trustworthiness of each of the consumer based upon a trust score computed from a probability score which is indicative of the sensitive information privacy breach. The probability score evaluated from an exploitation factor which is further derived from availability of quasi identifier information to the corresponding consumer and also upon the potency of each of the consumer to deduce the sensitive information from the available quasi identifier; and a negotiation module stored in memory and executable by a processor to negotiate upon degree of the sensitive information to be shared with the consumer upon communicating with the trust management module for the computed trust score.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. These and other features of the present invention will become more fully apparent from the following description, or may be learned by the practice of the invention as set forth hereinafter.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAILED DESCRIPTION OF THE INVENTION

Figure 1:
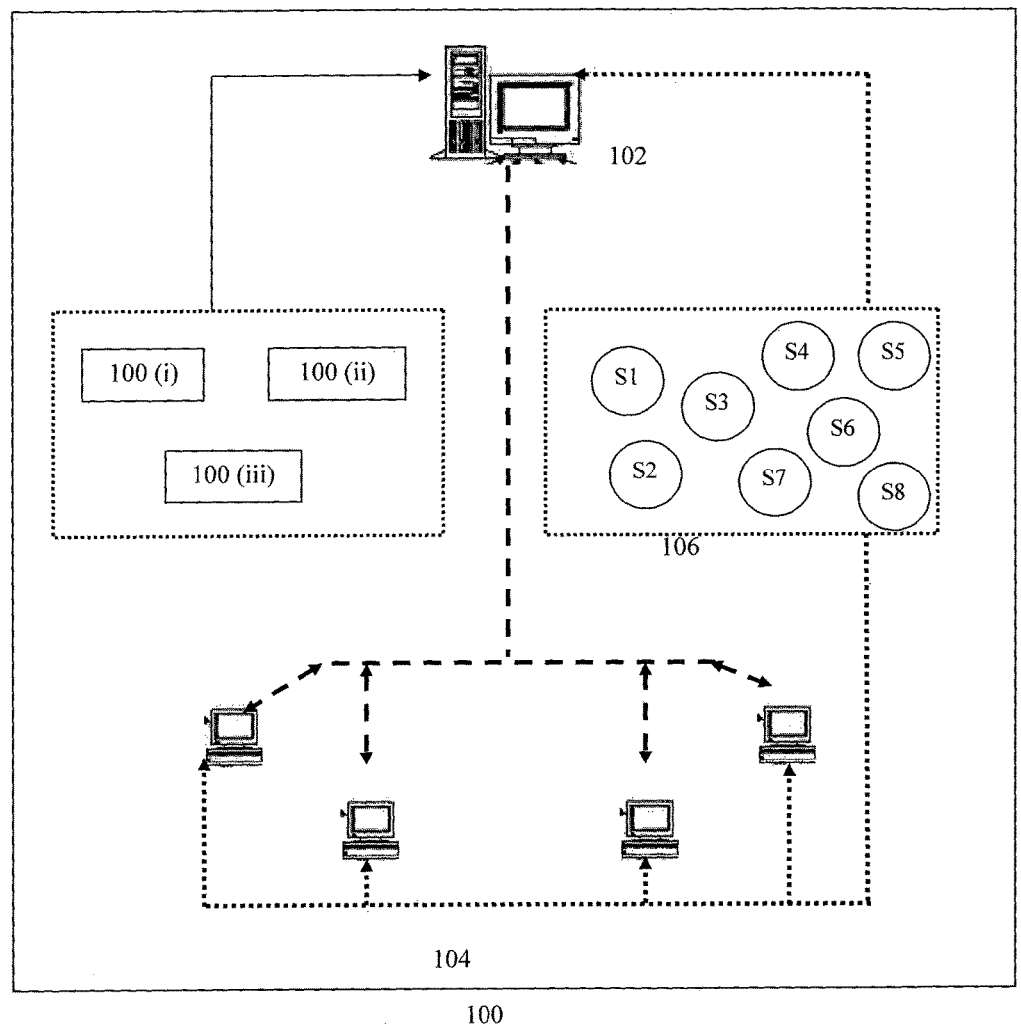
FIG. 1 shows an exemplary architecture in which the invention—the information access control method based on trustworthiness computing platform—is implemented according to an embodiment of the invention.

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment", appearing in various places throughout the specification, are not necessarily all referring to the same embodiment.

Embodiments of the present invention are directed to a system and a method for enabling an entity possessing sensitive information to share in a most secure and trusted way. The system computes trust score of the consumer or end user with whom the information is to be shared, and thereon uses the trust score value to evaluate if the consumer can be trusted for sharing the most sensitive information. Once the consumer is evaluated, the system empowers the information owner to decide on sharing/not sharing and partial sharing aspect of the information.

In one embodiment, the information owner is capacitated to decide on sharing its private data with respect to a parameter so that the decision is less subjective. In another alternate embodiment, the system and method of present disclosure allows minimum leakage of private information and makes information owner aware of the risk of privacy breach when private information is shared. The information owner can then utilize corrective measures like perturbing sensitive information when sharing, in case trust score of the consumer is low.

In a preferred embodiment, the information owner being made aware of the trust scores of the end consumers, can negotiate and thereupon decide upon sharing the extent of sensitive information therewith or choose amongst them the best fit end user with whom the entire sensitive information can be securely shared, thus providing maximization of sensitive data privacy protection. Moreover, the information owner is enabled to make cost benefit analysis of information sharing.

In accordance with one embodiment, a user or application—vis a vis—the information owner requires sharing its sensitive information, for say, location data with other application or to a server or an end user. Since the location data is private in nature and the user wants to share it cautiously. Here the user intends to get two sets of information—one about the privacy breaching probability of sharing location data to the end user and the other of trustworthiness of the end user with respect to that sensitive data (or attribute=location).

Privacy breach probability of the secret data is computed by the end user or a trusted third party having access to the corresponding end users and communicated to the owner before publishing or at the time of information capture. Trust score of the end user is computed by the (trusted) end user itself and shared with the sources with periodic or request-based publication or by trusted third party. Since the Information owner is enabled with these two pieces of information (privacy breach likelihood of the source for the end user and trust score of the end user) to decide on the sharing, it provides him with the capability of its privacy preservation and risk estimation. It also enables information owner to negotiate with the consumer when sharing private data.

In another embodiment, an information owner intends to select the health insurance provider and may decide on the quality vis-à-vis privacy respecting health care provider. When sensitive data like one's location or health data needs to be shared, the owner is enabled with the capability to estimate the likelihood of privacy breaching. In case of multiple end users available, owner may like to know about trust scores of each end user; based on which he can judiciary share the sensitive information with the end user having highest trust score value. For this reason, finding privacy breaching probability of a sensitive data to be shared needs to be evaluated.

FIG. 1 shows a system 100 that enables the information owner 102 to share his highly sensitive information, which illustrates one embodiment of the systems and methods described herein. Within the secure and trusted 100, the information owner 102 possessing the sensitive information set S (s1, s2, s3 . . . sn) over a personal computer or workstation (computer) which is equipped with a computer disk and a memory disk. The computer is linked to other computers of the end users 104 over a trusted network. The information module 100 (*i*) of the system 100 is configured to define the complete information structure for the information owner 102. The information structure is divided partly in the sensitive information that the owner 102 is required to share with the end users 104 and the quasi identifier information that is available from plurality of auxiliary sources, described in later sections of the disclosure. In other alternate embodiment, the system 100 of the present invention is deployed at the site of the information owner.

The system of FIG. 1 establishes a scenario, according to one exemplary embodiment of the invention, where user or application is the information owner 102 and server(s) 104 is end user for applications 102 and users 102; whereas, applications 104 are end users for user 102. Privacy breach likelihood of the secret data is computed by the system 100 and communicated to the owner 102 before sharing. Trust score value can be periodically published or request-based.

Considering where a particular user or application 102 holds an information structure, so defined by the information module 101 (*i*) and consisting of partly a sensitive data set S [s1, s2, s3 . . . sn] and partly a quasi-identifier set [Q]. S and Q can be scalar or vector. Quasi-identifiers are like information pointers to secret attributes of sensitive information and have the potential to explicitly identify the secret (private) information when compared with other external or background information. Sensitive data may be user's identity, location information, salary, disease information, and medical sensor data. On the contrary, Quasi-identifier, for example, can be zip code, age, marital status, educational qualification, vehicle type, medical practitioner's identity etc.

The consumer 104 can be a remote server, social networking site, other utility service provider or company, organizations etc, which asks information owner 102 to share its private data. The consumer 104 has the capability to avail quasi-identifier data Q from various other sources 106 E1, E2, E3, which are called auxiliary sources. Quasi-identifiers Q are available to the consumer 104 from auxiliary sources 106. Set Q may be different at different auxiliary sources 106 and one set of Q is available to the consumer 104.

Figure 2:
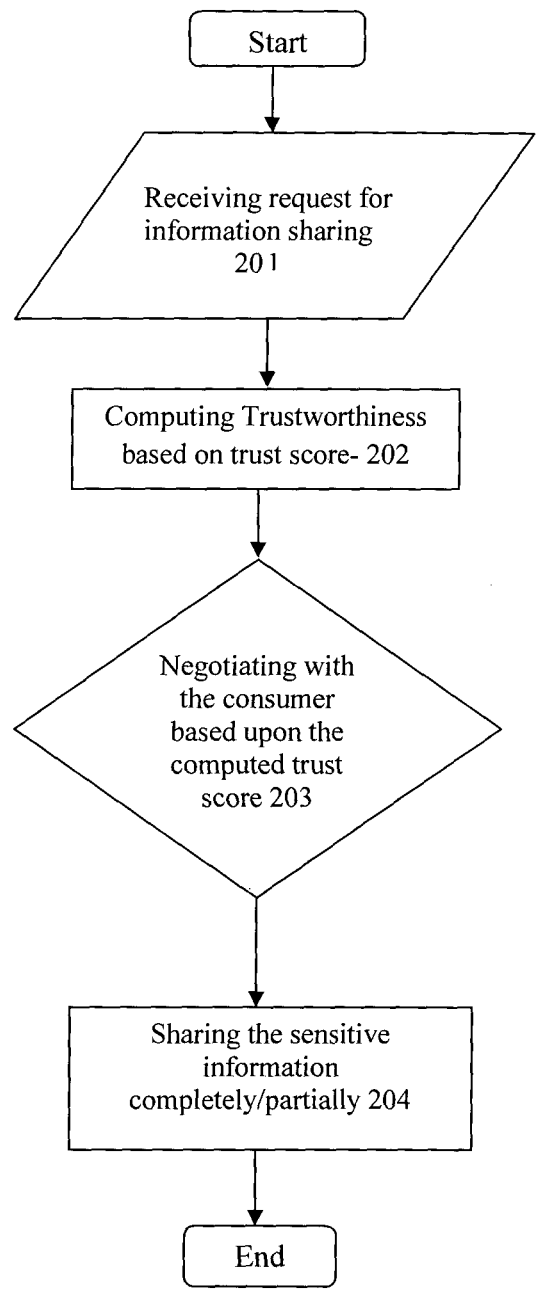
FIG. 2 is a flowchart illustrating the steps of an exemplary information access control method according to this invention.

Referring generally to FIGS. 1 and 2, and particularly to FIG. 2, whenever the user 102 is requested to send his/her private value [S], as shown in step 201, the trust score of auxiliary source 106 from Q(={Q1, Q2, Q3, QX}) is computed by the trust management module 100(*ii*) of the system 100, shown in step 202. Based on the trust score value Tx of consumer 104, the user 102 can decide to share the sensitive information [S] or not, as shown in step 203 and 204. Accordingly, the privacy breach probability of sensitive information will decrease with intelligent use of computed trust score.

In the event of multiple consumers (104) X={X1, X2, . . . }, the information owner 102 can choose X based on the trust score. More the value of trust score more is the probability of privacy preserving of sensitive data. Based on the trust score value, the user 102 negotiates with the consumer for the extent of sensitive information sharing using the negotiation module 100(*iii*), also shown in step 203 (of FIG. 2), and accordingly take the following, though not limited to, below given actions (indicated in step 204):

a) Decide to share with the consumer 104 its sensitive information [S] completely;

b) Negotiate with the consumer 104, via a negotiation module, upon the degree of information he considers suitable for sharing like:

1) With multiple consumers present, selecting the consumer having the highest rated trust score; or 2) With a consumer rated low for his trust score, the user can perturb some sets of sensitive information using any of the known perturbation algorithm like k-anonymity.

The other aspect of the present invention describes the process of computation of trust score by the trust management module 100(*ii*) based upon which the entire decision making of the user 102 rests. It shall be well understood that the consumer 104 acquire the capability of privacy breaching of information owner/user 102 when it avails quasi-identifiers Q from different auxiliary sources 106. Alternately the consumer may maintain his own database for information seeking.

In an illustrating embodiment, an imaginary health record is considered, the information structure (contained in the information module) of which is depicted in the Table 1 below:

TABLE 1

| Patient name | Age | Sex | Doctor assigned | Blood sugar | Uric acid | Zip | Disease |
|---|---|---|---|---|---|---|---|
| Jim | 22 | M | Scooby | 110 | 15.7 | 3093420 | Kidney failure |
| Kelly | 40 | F | Tim | 190 | 6.9 | 4509432 | AIDS |
| Tom | 75 | M | Allan | 80 | 12.2 | 11809591 | Hepatitis |
| Harry | 52 | M | Dino | 290 | 7.1 | 5409123 | Bone fracture |
| Jena | 43 | F | Marga | 343 | 6.1 | 8645001 | Diabetes |

Here, say Jim is the information owner 102 and the sensitive information that he owns represents a set [S]={blood sugar, uric acid, disease}. Let the consumer or end user 104 is a medical researcher and asks 102 to send a set of his sensitive information represented by [S']={blood sugar, uric acid}. Let Quasi identifier set Q={age, doctor assigned, zip} for the information structure.

Now, as understood the trust score and privacy preserving probability of the consumer 104 is its availability to Q. More the consumer gets Q, more is the probability that he can know about the complete sensitive information [S] from a section of said information [S'].

Trust score of a consumer 104 is computed by the trust management module 100(*ii*) based on his knowledge gain against the private data [S] and available quasi identifiers Q. Considering, that information owner 102 partially reveals his/her sensitive data, while consumer 104 being malicious is capable of deducing the complete sensitive data. In the above case, let the data owner 102 sends his/her blood test report only to a third party/consumer 104 while keeping his/her disease undisclosed. The set [S] is the complete sensitive data set, while [S'] is the partially revealed set shared with the consumer 104. While the user 102 wants that the unshared information [S∩S']' should not get revealed, consumer may like to get intentionally or unintentionally as much knowledge as possible from S' to derive S. Consumer 104 can get the knowledge gain from quasi-identifiers available from different sources 106. It is obvious to understand that knowledge gain is inversely proportional to trust score i.e. in order to register oneself as a trusted consumer he has to minimize the knowledge gain from auxiliary sources.

Next, in order to compute trust score of consumer 104, the trust management module 100(*ii*) does the following computation:

Firstly, the exploitation factor of the request information is calculated from two major information sets:
  a) Availability of quasi identifier information (a) from different sources; and
  b) Potency of the quasi identifier to expose privacy (p) of the sensitive information The exploitation factor of the requested data is thus dependent on the following.
  1. Number of quasi identifiers in the requested set
  2. Potency of each quasi-identifier to reveal the data owner's identity
  3. Availability of the quasi identifiers The Exploitation factor of the requested data is expressed as:

Exploitation factor=func(availability of quasi-identifier($a$),potency of the quasi-identifier to expose privacy ($p$))

For a quasi-identifier, the likelihood to exploit the sensitive information of an information owner 102 is a product of its potency to reveal identity (p) and its availability (a).

Next, the trust score is computed by the following expression:

Trust score ($Tx$)=1−Exploitation factor of the requested data, (Or) $Tx = 1 - a \cdot p$     (1)

The following given section will discuss in detail the two aspects of computing trust score—likelihood to exploit the sensitive information of an information owner 102 is a product of its potency to reveal identity (p) and its availability (a).

1) Potency to Reveal Identity (p)

Potency of a quasi-identifier is its ability to uniquely identify the information owner within a population of the available set of quasi-identifiers (Q).

$$p = \text{info\_gain}(Q); \text{ and}$$

$$\text{info\_gain}(Q) = \text{priv\_gain}(q)$$

$$\text{priv\_gain}(q) = \left( \sum_{i=1}^{|q|} q_i \cdot \log_2 \frac{1}{q_i} \right)$$

$$\text{info\_gain}(Q) = \left( \sum_{n=1}^{|Q|} \text{priv\_gain}(q_n) \right)$$

$$\text{so, } p = \left( \sum_{n=1}^{|Q|} \left( \sum_{i=1}^{|q|} q_i \cdot \log_2 \frac{1}{q_i} \right)_n \right)$$

2) Availability (a)

Availability of a quasi-identifier is determined by the number of auxiliary sources 106 supplementing the quasi-identifier are present and the degree of accessibility of such auxiliary sources 106 for that data consumer 104. For example the information on Wikipedia is more accessible than a National Defense employee's database. So availability may vary for every data consumer.

Some governing principles of availability are:
More the number of auxiliary sources providing the requested information more is the availability;
More public or accessible the auxiliary sources are, more is the availability One other exemplary embodiment considers a database containing a patient information table bearing the columns: Name, Date of Birth, Gender, Zip and Disease. Let the information related to Date of Birth, Gender, Zip combination forms a set of quasi-identifier information denoted as: $q_1$={Date of Birth, Gender, Zip}.

Let the information consumer 104 is a pharmaceutical company which requires the patient information as part of their medicinal research. The information owner 102 does not want his or her identity to be revealed and therefore mask the name column value while providing the other details to the consumer 104. But since the shared information has a quasi-identifier i.e. q1, there is a possibility of revealing the patient's identity. In this case, from (1), the Likelihood of exploitation for $q_1 = p_1 * a_1$.

Empirically it has been observed that 87% of the people in the U.S. can be uniquely identified by the combination of Gender, Date of Birth and Zip. Therefore (Gender, Date of Birth, Zip) forms a 0.87 quasi-identifier for the U.S. population.

Therefore let's consider the potency of q1 to be 0.87 and its availability for the data consumer as 0.85. Hence the likelihood of exploitation for q1=0.7395.

Hence $Tx$ for consumer=1−0.7395=0.2605.

Likewise, let the requested data have 'n' number of quasi identifiers.

| Quasi-identifier | Potency | Availability | L(Qi) |
|---|---|---|---|
| $Q_1$ | 0.87 | 0.8 | 0.696 |
| $Q_2$ | 0.7 | 0.3 | 0.21 |
| $Q_3$ | 0.5 | 0.5 | 0.25 |

The combined likelihood of exploitation for all three quasi-identifier is given by, $$L_{Ex3} = L(Q_1 \cup Q_2 \cup Q_3)$$

Here the inclusion exclusion principle of probability theory is applied to determine the value of $L_{Ex3}$. In this case, if the likelihood of exploitation for all the quasi-identifiers is assumed to be independent of each other then, $$L_{Ex3} = L(Q_1) + L(Q_2) + L(Q_3) - L(Q_1 \cap Q_2) - L(Q_1 \cap Q_3) - L(Q_2 \cap Q_3) + L(Q_1 \cap Q_2 \cap Q_3)$$

Therefore, $L_{Ex3} = 0.81988$ and $Tx = 1 - L_{Ex3} = 0.18012$.

Thus, Exploitation factor of requested data can be expressed as, $L_{Exn} = (\cup_{i=1}^{n} Qi)$ where 'n' is the number of quasi-identifiers in the requested data.

Now understanding that from the trust management module 100(*ii*) that if the trust score of the consumer 104 is low, the negotiation module 100 (*iii*) assists the information owner 102 to negotiate upon the degree of information to be shared and finally communicates the consumer regarding the owner decision of not sharing the sensitive details such as Gender, Date of Birth and Zip as it is. It has to protect the information owner's identity. This is how the information owner and data consumer negotiates via the negotiation module. For the pharmaceutical company, gender is important factor in medicinal research. Hence the consumer may want the gender value to be as it is. The owner 102 can anonymize the zip and DOB before sharing the information with the data consumer, as will be suggested by the negotiation module. This will reduce the potency of the quasi-identifier of revealing the owner identity which in turn reduces the likelihood of exploitation.

| Name | Date of Birth | Gender | Zip | Disease |
|---|---|---|---|---|
| Adam | 27 Jan. 1983 | Male | 422009 | Flu |
| Luther | 3 Jun. 1978 | Male | 411023 | Migraine |

In other alternate embodiment, when quasi-identifiers are dependent, Bayesian inference is required for computing availability "a". Consider, $Pr(q_1)$=probability of occurrence of quasi-identifier $q_1$, $Pr(s_1|q_1)$=probability of knowing the sensitive attribute $s_1$ from $q_1$, $Pr(q_2|q_1)$=probability of knowing another quasi-identifier $q_2$ from $q_1$. Availability "a" is the probability of knowing sensitive attribute $s_1$ from the quasi-identifiers, where, $$a = P_r(s1 \mid q1) = \frac{P_r(q1) \cdot P_r(s1 \mid q1)}{P_r(q1) \cdot P_r(q2 \mid q1) + P_r(q1) \cdot P_r(s1 \mid q1)}$$

Broadly, the system 100 is understood to comprise of an information module 100(*i*) configured to define an information structure; a trust management module 100(*ii*) to compute trustworthiness of each of the consumer from a probability score derived from an exploitation factor that is further defined as a product of availability of quasi identifier information to the corresponding consumer and potency of each of the consumer to deduce the sensitive information from the available quasi identifier; a negotiation module 100(*iii*) stored, in memory and executable by a processor to negotiate upon degree of the sensitive information to be shared with the consumers upon communicating with the trust management module 100(*ii*) and accordingly shares the information completely/partially with perturbation of the private data.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as machine readable medium having stored thereon instructions that may be used to program a processing system or other electronic device to perform the methods. The term "machine readable medium" or "processor implemented method" used herein shall include any medium that is capable of storing or encoding a sequence of instructions for execution by the processor and that causes the processor to perform any one of the methods described herein. Furthermore, it is common in the art to speak of software; in one form or another (e.g., program, procedure, process, application, module, logic, and so on) as taking an action or causing a result. Such expressions are merely a shorthand way of stating the execution of the software by a processing system to cause the processor to perform an action or produce a result.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow and their equivalents.

We claim:

1. A processor-implemented information access control method based on a trustworthiness computing mechanism, comprising:
    holding by an information owner an information structure including at least in partition a set of quasi identifiers available from a plurality of auxiliary sources, and in at least another partition a sensitive information associated with the information owner, wherein the quasi identifiers are information pointers, associated with the information owner, pointing to one or more secret attributes of the sensitive information and has a potential to identify secret information;
    receiving by the information owner, a request from at least one consumer to share the sensitive information;
    computing a trust score of the at least one consumer based upon a probability score indicative of a sensitive information privacy breach, wherein the probability score is evaluated from an exploitation factor derived from availability of the quasi identifiers to the at least one consumer and potency of the quasi-identifiers to expose privacy of the sensitive information, and wherein the potency of the quasi-identifier is an ability of the quasi identifiers to uniquely identify the information owner within a population of the set of quasi-identifiers, wherein the exploitation factor is a product of the availability of the quasi identifier information and the potency of the quasi-identifier to expose the privacy of the information owner, wherein the availability is derived from the number of auxiliary sources present and a degree of accessibility of the number of auxiliary sources to the at least one consumer, and
    restrictively share the sensitive information with the at least one consumer based upon the trust score.

2. The method of claim 1, wherein the at least one consumer is a remote server, a social networking site, an utility service provider or a company, an organization, a researcher, or a combination thereof.

3. The method of claim 1, wherein the trust score is computed after receiving the request from one or more consumers.

4. The method of claim 1, further comprises enabling the information owner to negotiate to restrict access of the sensitive information to the at least one consumer based partially on the trust score.

5. The method of claim 1, wherein the information owner restricts sharing of the sensitive information by using a k-anonymity technique.

6. The method of claim 1, wherein the information owner negotiates to restrict access of the sensitive information to the at least one consumer based completely on the trust score.

7. The method of claim 1 further comprises enabling the information owner to negotiate upon a degree of the sensitive information to be shared with the at least one consumer based upon the trust score.

8. The method of claim 1, wherein the sensitive information comprises information owner's identity, location information, salary, disease information, and medical sensor data, and the set of quasi identifiers comprises zip code, age, marital status, educational qualification, vehicle type, medical practitioner's identity.

9. An information access control system for restrictive information sharing with one or more consumers based on a trustworthiness computing mechanism, the system comprising:
- a processor; and
- an information module executed by the processor to define an information structure including at least in partition a set of quasi identifiers available from a plurality of auxiliary sources, and in at least other partition a sensitive information associated with the information owner, wherein the quasi identifiers are information pointers, associated with the information owner, pointing to one or more secret attributes of the sensitive information and has a potential to identify secret information;
- a trust management module executed by the processor to receive a request from at least one consumer for sharing the sensitive information; and
- compute a trust score of the at least one consumer based upon a probability score indicative of a sensitive information privacy breach, wherein the probability score is evaluated from an exploitation factor derived from availability of the quasi identifiers from the plurality of auxiliary sources to the at least one consumer and potency of the quasi-identifiers to expose privacy of the sensitive information, and wherein the potency of the quasi-identifier is an ability of the quasi identifiers to uniquely identify the information owner within a population of the set of quasi-identifiers, wherein the exploitation factor is a product of the availability of the quasi identifier information and the potency of the quasi-identifier to expose the privacy of the information owner, wherein the availability is derived from the number of auxiliary sources present and a degree of accessibility of the number of auxiliary sources to the at least one consumer; and
- a negotiation module stored in the memory and executable by the processor to restrictively share the sensitive information with the at least one consumer based upon the trust score.

10. The information access control system of claim 9, wherein the at least one consumer is a remote server, a social networking site, an utility service provider or a company, an organization, or the combination thereof.

11. The information access control system of claim 9, wherein the negotiation module restricts access of the sensitive information to the at least one consumer partially in response to the trust score computed by the trust management module.

12. The information access control system of claim 9, wherein the negotiation module restricts sharing of the sensitive information by using a k-anonymity technique.

13. The information access control system of claim 9, wherein the negotiation module restricts access of the sensitive information to the at least one consumer completely in response to the trust score computed by the trust management module.

14. The information access control system of claim 9, wherein the negotiation module further negotiates based on a degree of the sensitive information to be shared with the at least one consumer based upon the trust score.

15. The information access control system of claim 9, wherein the sensitive information comprises information owner's identity, location information, salary, disease information, and medical sensor data, and the set of quasi identifiers comprises zip code, age, marital status, educational qualification, vehicle type, medical practitioner's identity.

* * * * *